United States Patent [19]

Ponting

[11] Patent Number: 5,067,842

[45] Date of Patent: Nov. 26, 1991

[54] JOINT ASSEMBLY INCLUDING WIRE REINFORCING ELEMENT AND FOAM MATERIAL

[75] Inventor: Robert F. B. Ponting, Durban, South Africa

[73] Assignee: Kwalu (Proprietary) Limited, Jakobs, South Africa

[21] Appl. No.: 450,173

[22] Filed: Dec. 13, 1989

[51] Int. Cl.$^5$ .................. F16B 12/04; F16L 13/11
[52] U.S. Cl. ............................ 403/265; 156/79; 156/293; 156/296; 156/304.2; 403/189; 403/237
[58] Field of Search ............ 156/293, 294, 296, 304.2, 156/304.3, 257, 79; 264/45.7; 403/186, 230, 247, 252, 263, 264, 265, 266, 270, 187, 188, 190, 191, 201, 237, 229, 295, 292; 428/319.1; 297/DIG. 1; 52/309.7

[56] References Cited

U.S. PATENT DOCUMENTS

| | | | |
|---|---|---|---|
| 998,582 | 7/1911 | Lucas | 403/252 |
| 2,846,241 | 8/1958 | McDonnell et al. | 403/230 |
| 3,126,595 | 3/1964 | Dewey et al. | 264/46.7 |
| 3,158,224 | 11/1964 | Van Name et al. | 403/186 |
| 3,310,613 | 3/1967 | Lundberg | 156/79 |
| 3,368,836 | 2/1968 | Storlie et al. | 403/295 |
| 3,437,059 | 4/1969 | Stonier et al. | 403/229 |
| 3,616,024 | 10/1971 | Windle | 156/293 |
| 3,791,095 | 2/1974 | Martin | 403/295 |
| 3,810,337 | 5/1974 | Pollard | 428/319.1 |
| 3,970,401 | 7/1976 | Lubeck | 403/265 |
| 4,081,177 | 3/1978 | Graff | 403/229 |
| 4,231,834 | 11/1980 | Gonzalez | 156/294 |
| 4,240,764 | 12/1980 | Wegner | 403/252 |

Primary Examiner—Michael W. Ball
Assistant Examiner—Steven D. Maki
Attorney, Agent, or Firm—Jones, Tullar & Cooper

[57] ABSTRACT

A joint assembly, which is particularly useful in the formation of tubular plastic furniture, includes a hole formed in a first member and a second member having a first end which engages the hole. Reinforcing wire members are provided in the joint assembly together with a suitable adhesive and a settable material.

5 Claims, 1 Drawing Sheet

JOINT ASSEMBLY INCLUDING WIRE REINFORCING ELEMENT AND FOAM MATERIAL

FIELD OF THE INVENTION

This invention relates to joints for tubular plastic furniture such as chairs, tables, display stands or the like and to a method of making the furniture. The invention is additionally concerned with making tubular plastic furniture which has the appearance of natural cane, bamboo or the like.

BACKGROUND TO THE INVENTION

Natural cane, as is the case with most natural products, is becoming scarce and therefore expensive and yet remains a desirable product for the manufacture of furniture.

Furniture made from plastic tubing is also currently popular because of its relative cheapness compared to cane or timber furniture. The disadvantage of tubular plastic furniture is, however, the unsightliness of the joints between the various tubular components which for reasons of strength are sleeved joints which, in many cases, resemble plumbing fittings.

SUMMARY OF THE INVENTION

It is the object of this invention to provide a joint assembly for tubular plastic furniture, a method of making the furniture and more particularly the making of the furniture to have the appearance of cane, bamboo or the like.

A method of making tubular plastic furniture according to the invention includes the steps of joining a first tubular element to a second at a position in its length by providing a hole in the wall of the second element at the position of the joint, attaching the first element to the second with the bore of the first element in communication with the bore of the second through the hole in its wall and filling the bores of both elements at least in the zone of the joint with a settable material.

Further according to the invention the method includes the step of locating suitable reinforcing material across the joint in the bores of both tubular elements prior to filling the bores of the elements with the settable material.

A method of giving a tubular plastic element the appearance of natural cane according to the invention includes the steps of grooving the outer surface of the element to resemble natural cane.

Preferably the method includes the step of heating short lengths of the element to soften the plastic and expanding the softened portions of the element radially to provide the element with the appearance of a joined cane stem.

Conveniently the method includes the steps of paint finishing the tubular element to resemble natural cane.

According to the invention there is provided tubular plastic furniture which includes tubular elements which are joined according to the above method.

Further according to the invention the tubular elements are provided with a natural cane appearance by the above method.

BRIEF DESCRIPTION OF THE DRAWINGS

The invention is now described by way of example only with reference to the drawings in which.

DETAILED DESCRIPTION OF THE DRAWINGS

Figure 1:
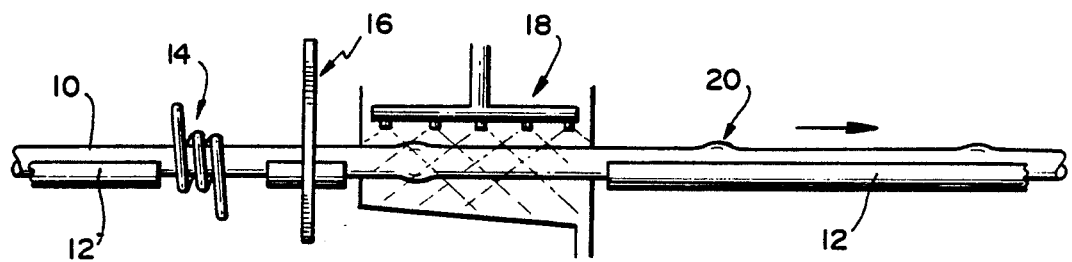
FIG. 1 is a schematic side elevation of the apparatus for deforming tubular plastic elements to resemble natural cane.

The tubular plastic material from which the furniture of the invention is made is PVC tubing which has smooth inner and outer walls. In the first step of manufacturing the furniture of the invention the outer wall of the tubing is longitudinally grooved with the grooves having random depths as is the case in natural cane. The tubing may be grooved by a die during the tube extrusion process or may be scraped with a sharp instrument such as a saw blade which is held transverse to the axis of the tube while the tube is scraped. In the second stage of providing the tube with a cane appearance the tubular element 10 is laid in an elongated guide which may consist of a plurality of U-shaped support sections 12 which are held in longitudinal alignment on a bed which is not shown in FIG. 1. Interposed between the ends of various lengths of the supports 12 are a spiral shaped heater element 14, a planar heat shield 16 which is holed for the passage of the tube and a spray booth 18.

Figure 2:
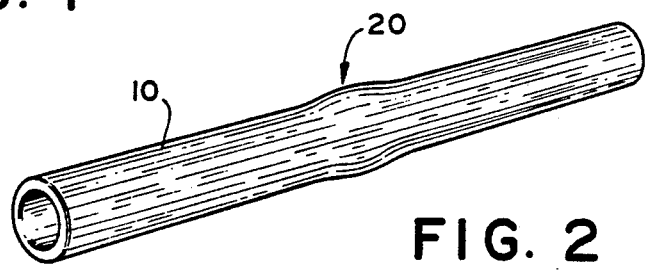
FIG. 2 is a perspective view of a short length of a tube which has been deformed by the apparatus of FIG. 1.

In use, the tubular element 10 is fed along the supports 12 in the direction of the arrow in FIG. 1 until a short length of the element has passed through the heater 14 and then stopped. The heater is then activated for a suitable period of time to soften the wall of the tube over the portion of its length which lies within and adjacent the heater coils. The tubular element 10 is then upset by moving the tube portions on either side of the heater 14 towards each other to deform the softened portion of the tube radially outwardly as shown at 20. The upset portions 20 of the tubular element are more clearly seen in FIG. 2. The tubular element 10 is then again fed in the direction of the arrow in FIG. 1 to pass through the heat shield 16 and through a grommet in the outer wall of the spray booth 18 and into the spray booth where the still slightly softened upset portion of the tube is cooled by cold water sprays in the booth. When a suitable length of the tubing has passed through the heater 14 the tubing is again stopped and heated by the heater and again upset. This process is repeated at regular intervals over the length of the tube to provide the tube with a naturally jointed cane appearance. Instead of manually upsetting the tube 10 to provide the jointed bulges 20 the ends of the tube could be suitably blanked with an air hose passing through one of the blanks to pressurise the inside of the tube so that it would be expanded automatically by the pressure air in the heater zone when the wall of the tube has become sufficiently softened. Provided the tube 10 is moved quickly enough through the FIG. 1 apparatus the heater 14 could be left on and with the pressure air method of expanding the tube the apparatus could become almost fully automatic.

Figures 3, 4:
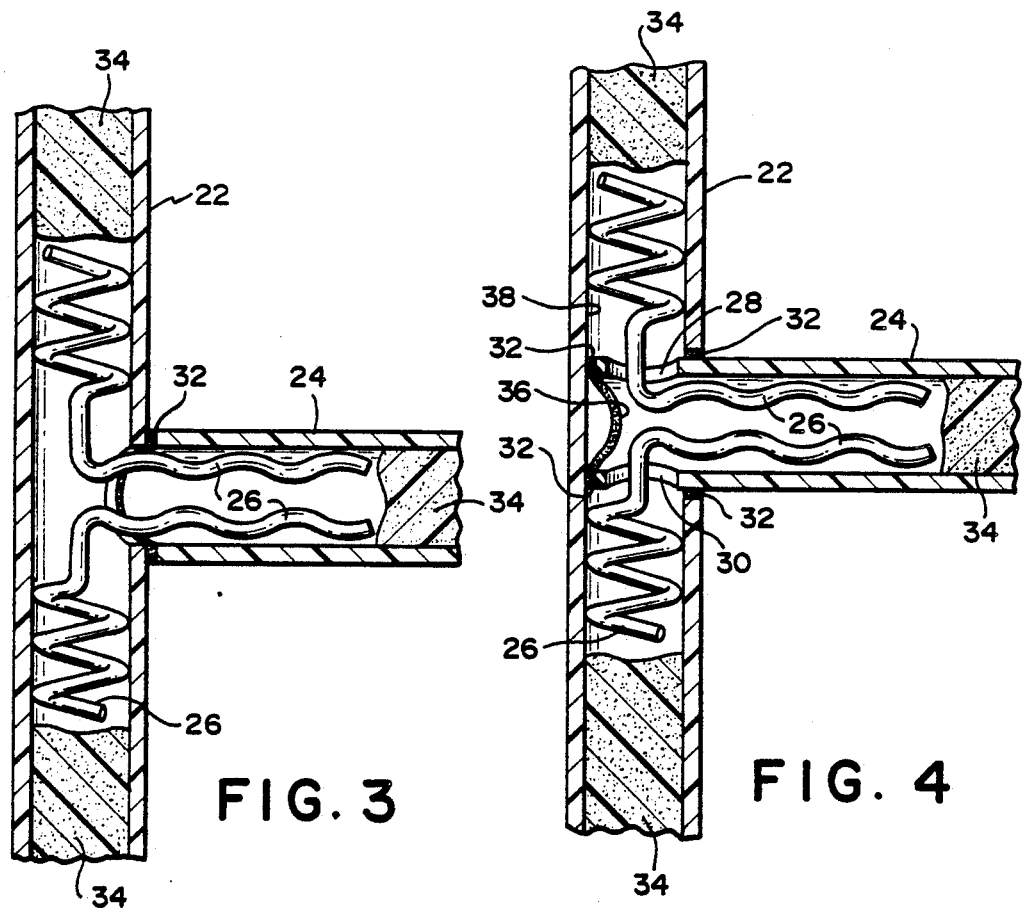
FIG. 3 is a sectioned side elevation of a joint between two tubular plastic elements.
FIG. 4 is a similar view to that of FIG. 3 of a second embodiment of a joint between two tubular elements.

To construct furniture from the cane like tubular elements 10, suitable lengths of the elements could be joined as shown in FIGS. 3 and 4.

In FIG. 3 the joint is made by holing a first tubular element 22 and grinding the free end of a second element 24 to a convex shape which is a snug fit over the outer wall of the tube 22. Heavy wire reinforcing elements 26, having coiled shaped first portions positioned in the first tube 22 and having sinusoidal shaped second portions positioned in the second tube 24, as seen in FIGS. 3 and 4, are then located in the bores of the tubes 22 and 24 to be located across the joint between the two tubes. The contact surfaces of the tubes could, and preferably are, coated with a suitable PVC adhesive 32 which will bond the two tubes together in their contact areas.

When the joint has been completed, liquid polyurethane foam 34 or a similar non-toxic foam is poured into the tubes and allowed to expand and fill the tubes with the foam material which is rigid when set. It is, however, not essential to the invention that the foamed material is rigid when set and it may be desirable to use a slightly resilient material so that the joints of the furniture are very slightly flexible and so more resilient to impact damage.

In the FIG. 4 embodiment of the joint, the tube 24 has its free end 36 convexly rounded to comform to the radius of curvature of the inner wall 38 of the tube 22 and has two holes 28 and 30 drilled through its walls to be in register on the axis of the tube 22. The tube 24 is then pressed into the hole in the wall of the tube 22, again preferably with a suitable adhesive 32 on the tube surfaces which abut each other in the joint. The tubes of the article of furniture are again filled with foam 34 so that the joint zones of the furniture tubes are homogeniously foam filled. The FIG. 4 embodiment of the joint could, of course, also include suitable reinforcing elements 26, which are shaped and positioned the same as the wire reinforcing elements discussed above, and which pass from the bore of the tube 22 across the joint into the bore of the tube 24 to further strengthen the joint between the two tubes.

Both the FIGS. 3 and 4 joints are preferably strip wrapped as are the joints in conventional cane furniture. Preferably the wrapping strips are made of a suitable plastics material which may be tightly heat shrunk over the tubes at the joints.

The tubular elements 10 from which the furniture of the invention is made could be, and are preferably, colored by a pigment which resembles natural cane in color as closely as possible. The tubular elements may then be wiped with a fairly dark almost black colored paint to fill the grooves in the outer wall of the tube and then either wiped or rapidly dipped in a lighter cane colored paint to provide an authentic looking finish to the tubes.

The invention is not limited to the precise details as herein described and the tubular elements 10 could be made to represent lengths of bamboo as opposed to cane by simply expanding the upset portions 20 of the tubular element into contact with a heated ring to provide a circumferential groove in the centre of the upset portion 20 of the tube to resemble the grooved joints of bamboo. Additionally, to create more exact upset portions 20 in the tube the outer wall of the tube could be expanded into contact with the inner wall of a mould which could be suitably profiled to insure that each of the upset portions of the tubes are identical. Also, the furniture joints of the invention are not limited to those illustrated in FIGS. 3 and 4 and the tube 24 of FIG. 3 could, for example, carry on its inner surface and protruding from its free end a tubular spigot which is bonded to the inner wall of the tube 24 to protrude into the tube 22. The spigot when would, of course, require holes similar to the holes 28 and 30 in FIG. 4 for reinforcing material, if required, and to enable the joint to be foam filled.

I claim:

1. A joint assembly comprising:
   a first hollow member having a wall with an outer wall surface and an inner wall surface;
   a first hole formed in said wall of said first hollow member and passing through said inner and outer wall surfaces intermediate spaced first and second ends of said first hollow member;
   a second hollow member having a first end secured to said first hollow member and shaped to engage said first hole of said first hollow member;
   adhesive means bonding said second hollow member to said first hollow member at a peripheral portion of said first hole;
   at least a first wire reinforcing element having a first coil-shaped portion positioned in said first hollow member and contacting said inner wall surface thereof, and a second portion extending through said first hole and into said first end of said second hollow member; and
   a settable expanded foam material within and filling said first and second hollow members at said joint to render said joint assembly impact resistant.

2. The joint assembly of claim 1 wherein said first end of said second hollow member engages said outer wall surface of said first hollow member at said first hole.

3. The joint assembly of claim 2 further including a second wire reinforcing element having a first coil-shaped portion positioned in said first hollow member and contacting said inner wall surface thereof, and a second portion extending through said first hole and into said first end of said second hollow member.

4. The joint assembly of claim 1 wherein a first end face of said second hollow member engages said inner wall surface of said first tubular member and a first end surface of said second hollow member engages said first hole, said second hollow member having a second hole in said first end surface and adjacent said first end face, said first wire reinforcing element passing through said first and said second holes.

5. The joint assembly of claim 4 wherein a third hole is provided in said first end surface of said second hollow member, said third hole being generally opposite to said second hole and further wherein a second wire reinforcing element having a first coil shaped portion and a second portion passes through said first and third holes.

* * * * *